Patented May 1, 1945

2,375,095

UNITED STATES PATENT OFFICE 2,375,095

INSECTICIDES

Lawrence H. Flett, Hamburg, N. Y., assignor to Allied Chemical & Dye Corporation, a corporation of New York No Drawing. Application January 23, 1941,
Serial No. 375,615

10 Claims. (Cl. 167—30)

This invention relates to insecticides, and more particularly to insecticides suitable for application to plants, trees, shrubs, and the like to protect the same against insect pests.

In general, insect poisons heretofore employed have very little wetting or spreading power. Attempts have been made to overcome this by the use of spreading agents. These spreading agents have brought about some improvement in the insecticidal power of various insect poisons; but the insecticides, in spite of these spreading agents, are inadequate unless they are used in excessive quantities, often in such excessive concentrations as to cause phytocidal action; furthermore, they are only effective, if at all, with respect to specific insects, and when applied to edible plants they leave undesirable poisonous residue on fruits and vegetables. The present invention relates to improved insecticides in which compounds which may be prepared in non-toxic forms and have wetting and spreading power as well as insecticidal action are employed.

In my application Serial No. 691,082, filed September 26, 1933, which issued as United States Patent No. 2,249,757, I have disclosed mixtures of sulfonated aromatic compounds of the type AHRS (wherein A represents an aromatic nucleus; i. e. an aromatic nucleus which may contain only the groups represented by H, R, and S as substituents or which may contain additional substituents, H represents a nuclear hydroxyl group, R represents a nuclear alkyl group containing at least 12 carbon atoms, and S represents a nuclear sulfonic acid group in the free acid or salt form), and especially mixtures of alkyl phenol sulfonic acid compounds which correspond with the general formula

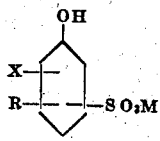

in which X represents hydrogen or a methyl group, R represents a nuclear alkyl hydrocarbon radical (saturated or unsaturated) containing 12 or more carbon atoms, and M represents hydrogen or a metal, particularly an alkali metal, or an ammonium or organic ammonium radical.

Further, in my application Serial No. 737,777, filed July 31, 1934, which has issued as United States Patent No. 2,196,985, I have disclosed mixed products of the type AHRS in which the alkyl group represented by R is derived from a petroleum distillate.

In my application Serial No. 93,521 filed July 30, 1936, which issued as United States Patent 3,283,199, I have disclosed mixed alkyl benzene sulfonates and mixed alkyl naphthalene sulfonates, among others, in which the alkyl groups are derived from a petroleum distillate (kerosene).

According to the present invention, mixed alkyl aromatic sulfonates of the type A'RS (in which S has the meaning defined above, A' represents a single benzene nucleus or a naphthalene nucleus, and R represents a nuclear alkyl group containing at least 10 carbon atoms), including compounds of the type A'HRS, derived from a mineral oil, preferably by condensation with a halogenated hydrocarbon mixture of the type of Pennsylvania petroleum distillates, are employed per se as insecticides. The insecticidal compositions of this invention comprise a mixture of nuclearly alkylated aromatic sulfonic acids or their salts in which the aryl nucleus is a single benzene nucleus or a naphthalene nucleus and has as a nuclear substituent an alkyl group which contains at least 10 carbon atoms, preferably not less than 10 and not more than 18 carbon atoms. The benzene or naphthalene nucleus can contain other substituents in addition to the essential C-alkyl group and C-sulfo group.

I have found that the said sulfonated products, particularly those derived from halogenated hydrocarbon mixtures of the type of Pennsylvania petroleum distillates boiling within the range of 170° to 320° C. and preferably within the narrower range of 200° to 290° C. at atmospheric pressure, are valuable insecticides which are characterized by effective insecticidal action in addition to wetting and spreading power. As a result they can be employed in aqueous or other solutions and in dispersions or powders at low concentrations. Thus, they are effective in aqueous solutions of a concentration on the order of 0.01% to 5% of said sulfonate. They are ordinarily applied in concentrations of 0.1% to 1.0% and in general 0.5% of said sulfonate. In combatting insects occurring on very sensitive foliage, for example, on beans or new rose leaves, concentrations of 0.5% or less of the sulfonate should be employed. For treatment of most plants, however, which are much less sensitive, such, for example, as gladioli, cabbage and asters, solutions having a concentration as high as 3 to 4% may be used without injuring the plant. Effective control of the insects may generally be obtained using concentrations substantially below that above specified. Hence, it is an important feature of this invention that at the concentrations at which it is used to obtain effective control of the insect, it does not injure the plant, i. e. has little or no phytocidal action.

The insecticides of this invention are highly effective both against insects controlled by contact poisons and by stomach poisons, since they act both as contact and as stomach poisons. Many of the organic ammonium salts are of relatively low solubility in water and are of an adherent nature which renders them of particular value in the control of insects on vegetation. Further, the sulfonates herein enumerated act as repellents; for example, it has been found that cockroaches will avoid surfaces which have been washed with the insecticides of this invention. Hence, it is another important feature of this invention that the insecticides disclosed and claimed herein can be used to control a large number of different insects. The following list gives examples of insects which it has been found can be controlled by the insecticides of this invention:

*Aphis spireacola* (Spirea aphid)
*Aphis pomi* (Green apple aphid)
*Brevicoryne brassicae* (Cabbage aphid)
*Malacasoma americana* (Eastern tent caterpillar)
*Epilachna varivestis* (Mexican bean beetle, larvae and pupae)
*Diabrotica vittata* (Striped cucumber beetle)
*Anasa tristis* (Squash bug)
*Melanoplus femur rubrum* (Red-legged grasshopper)
Aster lace fly
*Illinoia solanifolii* (Potato aphid)
*Aphis rumicis* (Bean aphid)
*Macrosiphoniella sanbornia* (Chrysanthemum aphid)
*Macrosiphum rosae* (Rose aphid)
*Rhopalosiphum pseudobrassicae* (Turnip aphid)
*Typhlocyba pomaria* (White apple leaf hopper)
*Corythucha contracta* (Walnut lacebug)
*Tetranychus tellarius* (Red spider)
Daisy thrips
*Illinoia pisi* (Pea aphid)
*Eriocampoides limacina* (Pear slug)
*Ascia rapae* (Imported cabbage worm)
Chrysanthemum thrips
*Leptinotarsa decemlineata* (Colorado potato beetle)
Black ants
Cockroaches The compositions of the present invention have the further advantage that the salts of said alkyl aromatic sulfonates containing non-poisonous metals or bases such as the alkali metals, are sufficiently non-toxic to warm-blooded animals to permit their use as insecticides in proximity to cattle, and for the extermination of insects which occur on plants intended for consumption by human being or other warm blooded animals, in which cases, as is well known, insect poisons, such as lead arsenate, calcium arsenate, nicotine, sodium fluoride, etc., are or may be harmful.

Compounds in which the alkyl group contains 10 to 18 carbon atoms, and especially 11 to 16 carbon atoms, are particularly effective in view of their superior combination of wetting, spreading and insecticidal properties and are preferred. Further, the alkyl group represented by R is preferably an open-chain hydrocarbon radical.

Preferred compounds employed in accordance with the present invention are the mixtures of alkyl derivatives of mononuclear aromatic hydrocarbon sulfonic acids (i. e. aromatic hydrocarbon sulfonic acids containing a single benzene nucleus) in which the alkyl groups correspond with the aliphatic hydrocarbons of petroleum distillates and similar hydrocarbon products boiling mainly above 170° C. at atmospheric pressure, more particularly between 170° C. and 320° C. and especially between 200° C. and 290° C. (all at atmospheric pressure), and especially aliphatic hydrocarbon mixtures of the Pennsylvania petroleum kerosene type, of said boiling characteristics. Such preferred compounds are obtainable by halogenation of one of the said petroleum distillates or similar products, followed by condensation of the resulting mixed alkyl halides with a corresponding aromatic hydrocarbon, preferably with the aid of a metal halide condensing agent, and sulfonation of the resulting mixed alkyl derivatives of the aromatic compound.

In those cases where it is desired to employ an insoluble form of the sulfonate in an aqueous medium, a water-soluble form of the same or of another sulfonate of the said type can be employed to disperse the insoluble sulfonate, whereby the advantageous properties of both forms come into play. The soluble alkyl aryl sulfonates can be mixed mechanically with the insoluble amine salts of the alkyl aryl sulfonates, or the amine salts and soluble sulfonates can be incorporated in a water suspension or solution, or in a solution in an organic solvent. The liquid phase of the dispersion or solution can then be removed by mechanical means or evaporation, to leave a solid or thick paste, which can be incorporated at will and at a desired concentration in water or in an organic solvent.

The said alkyl aromatic sulfonates in which the aryl nucleus is a single benzene nucleus may be obtained by various methods, a number of which are disclosed in my Patents Nos. 2,196,985, 2,249,757 and 2,283,199.

The alkyl aromatic sulfonates may be employed in accordance with the present invention in the form of their free sulfonic acids or in the form of salts of metals (as, for example, of the alkali metals) or of organic bases, or of ammonia, etc. The salts may be obtained in any suitable manner; for example, by reacting the alkyl aromatic sulfonic acid, either in the crude form resulting from the sulfonation of the corresponding alkyl aromatic compound or in a purified form, with a metal oxide or hydroxide or an organic base, or of a suitable salt of one of these, preferably in an amount adapted to form a neutral product.

The organic amines which may be used for neutralizing the alkyl aryl sulfonic acids to form the amine salts of the compositions of this invention can be aliphatic, aromatic or heterocyclic. They are preferably free from salt-forming groups, such as sulfonic or carboxylic groups. The preferred amines form salts with the sulfonated alkyl aryl compounds which are insoluble or slightly soluble in water, and, therefore, resist removal by water, for example, rain. Their dispersions retain the toxic characteristics of the amines and the spreading, wetting and penetrating qualities of the alkyl aryl sulfonates.

Among the bases, oxides and salts which may be employed to produce salts useful in accordance with the present invention, are, for example, sodium, potassium and ammonium hydroxides; sodium, potassium carbonates and bicarbonates; ammonia; magnesium oxide; basic copper carbonate; ethylamine; mono, di and tri-propylamines, -butylamines, -amylamines, etc.; pyridine; triethanolamine; propanolamines; butanolamines; diamino propanol, triethylene tetramine, quinaldine, aniline, toluidines, phenetidines, stearylamine, ethylene diamine, quinoidine, piperidine, cetylamine, nicotine, etc. Mixed amines also may be employed.

The invention will be illustrated by the following examples: the parts are by weight.

The alkyl phenol sulfonates referred to in the following examples may be obtained from a Pennsylvania kerosene distillate, as disclosed in Example 24 of Patent No. 2,196,985. According to this example a mixture of alkyl derivatives of phenol in which the alkyl groups are derived from a kerosene distillate boiling within a range of 225° to 275° C. is sulfonated and the sulfonation mixture neutralized. For convenience the unneutralized sulfonation product will be referred to herein as "kerosene phenol sulfonic acid."

The alkyl benzene sulfonate utilized in Example 6 is produced as follows: the temperatures are in degrees centigrade.

10,620 lbs. Pennsylvania kerosene (having a specific gravity of 0.788 at 25° and boiling range from 185° to 275°) were charged to a lead-lined kettle fitted with lead-covered agitator, thermometer well and other accessories. 4.4 lbs. of iodine were dissolved in the agitated kerosene charge which was then warmed to about 60° and maintained between 60° and 70° while chlorine gas was passed into the liquid at an average rate of about 300 lbs. per hour, until the specific gravity of the chlorinated kerosene was 0.918 at 24°. The amount of chlorine required for the purpose was about 4825 lbs. The final chlorinated kerosene mixture weighed 12,834 lbs.

A mixture of 13,272 lbs. of benzene and 332 lbs. of anhydrous aluminum chloride was agitated, and 6636 lbs. of the chlorinated kerosene mixture were added thereto over a period of three hours, during which the temperature of the mass rose to about 35°. The mixture was then heated to 45° and held there for about 1½ hours. Agitation was then stopped, the mixture was allowed to stand for about 2 hours; thereafter the lower tarry layer was withdrawn. The upper layer was conveyed to a stripping kettle in which the liquid was stripped of low-boiling hydrocarbons, chiefly benzene, by boiling the liquid until its temperature reached 150° at atmospheric pressure, then reducing the pressure in the distilling system to an absolute pressure of 3 to 4 inches of mercury and continuing the boiling without further supply of heat for about one hour, until the temperature of the distilland was about 120°. The material left after this stripping was distilled in vacuo until about 7 per cent of the charge in the still had been removed as distillate. The remaining distilland was distilled, and distillate therefrom was collected separately until the boiling point of the distilland was 250° at 14 mm. mercury pressure. This last distillate was chiefly the condensation product of the chlorinated hydrocarbons of the kerosene fraction and the benzene; and for convenience it is called "keryl benzene."

The keryl benzene was given a purifying treatment by mixing it with about 15 per cent of its weight of 100 per cent sulfuric acid and agitating the mixture for about 1 hour at about 40°. The mixture was allowed to stand about a half hour to permit separation of a lower layer of acid and impurities, which was withdrawn and discarded.

The upper, acid-treated layer of keryl benzene was then sulfonated by mixing it with about 1¼ times its weight of 100 per cent sulfuric acid at a temperature between 30° and 35°, warming the mixture to 55° and agitating it at that temperature for 1 hour, and then allowing it to stand for 2 hours during which time three layers of material separated. The top layer was chiefly unsulfonated material; the middle layer was chiefly sulfonated keryl benzene; and the bottom layer was spent sulfuric acid. The middle layer was separated from the others, drowned in ice water, and neutralized with caustic soda (aqueous solution).

EXAMPLE 1

The sodium salt of kerosene phenol sulfonic acid, free from inorganic sulfates, is dissolved in water. The effectiveness of the resulting solution as an insecticide is shown in the following tables.

I. *Insecticide by spraying as contact poison*

| Parasite | Per cent concentration | Per cent kill | Time in hours |
|---|---|---|---|
| Aphis pomi | 0.5 | 99.2 | 48 |
| Do | 0.125 | 98.5 | 24 |
| Aphis spireacola | .25 | 96.3 | 24 |
| Anasa tristis | 0.5 | 80 | 48 |
| Leptinotarsa decemlineata (Colorado potato beetle) | 0.5 | 70 | 48 |
| Aster lace fly | 0.5 | 97 | 48 |

II. *Insecticide by spraying leaves (stomach poison)*

| Parasite | Per cent concentration | Per cent kill | Time in hours |
|---|---|---|---|
| Leptinotarsa decemlineata | 0.25 | 56 | 24 |
| Do | 0.25 | 63 | 48 |
| Do | 0.25 | 100 | 100 |
| Do | Control | 0 | 48 |
| Do | Control | 10 | 100 |
| Anasa tristis | 0.25 | 75 | 100 |
| Do | Control | 5 | 100 |

The following table illustrates the effect of varying acidity upon the insecticidal action of the product as a contact insecticide.

III

| Parasite | Per cent concentration | pH | Per cent kill in 48 hours |
|---|---|---|---|
| Aphis pomi | 0.05 | 2.9 | 100 |
| Do | 0.05 | 4.9 | 100 |
| Do | 0.05 | 7.0 | 94.6 |
| Do | 0.05 | 9.1 | 70 |
| Do | 0.05 | 11.0 | 70 |

EXAMPLE 2

An aqueous solution of kerosene phenol sulfonic acid (substantially free from residual sulfuric acid) is neutralized with mono-amyl amine to render it neutral to Congo 4B and Brilliant Yellow C papers. A mixture of amine salts of the kerosene phenol sulfonic acid separates as an oil and is removed from the aqueous layer. It is a dark brown viscous liquid which is lighter than water in which it is only very slightly soluble. It is readily dispersed in aqueous solutions by water-soluble dispersing agents, as for example, the sodium alkyl aromatic sulfonates herein disclosed. For such dispersions, an amount of dispersing agent ranging from about one quarter to an equal weight of the amine salt is sufficient. The amine salt is also soluble in organic solvents as, for example, benzene.

Aqueous compositions, which contain up to about 1 per cent by weight of these amine salts, may be used as insecticidal sprays for plants, without fear of phytocidal effects. The aqueous sprays wet and spread over the leaves and stems of the plants very rapidly and adhere in the form of thin continuous films.

EXAMPLE 3

Triamylamine is employed instead of monoamylamine in above Example 2. The neutralized mixture, after standing for some time, separates into two layers. The upper, oily layer of triamylamine salts of the mixed alkyl phenol sulfonates is removed and is used in water dispersions in concentrations of 0.25 to 5 parts of the amine sulfonates per 100 parts water containing a dispersing agent. These aqueous dispersions form excellent insecticides for treating plants, animal shelters and runs (for example, chicken coops).

EXAMPLE 4

An aqueous solution of the kerosene phenol sulfonic acid employed in above Example 2 is neutralized with a solution of quinoidine in alcohol. ("Quinoidine" is the name applied to the mixture of alkaloid substances remaining after extraction of the more valuable and crystalline alkaloids from crude cinchona.) The mixture, after evaporating the alcohol, leaves a thick paste which is insoluble in water. 10 parts of this thick paste, 10 parts of a salt-free mixture of sodium kerosene phenol sulfonate, and about 20 parts of alcohol are thoroughly mixed, and the resulting paste is dried by evaporation of the alcohol. The dry residue can be dispersed in water easily to give milky emulsions which may be used as insecticidal sprays. Such emulsions containing up to 2 per cent of the dry mixture are made quite readily.

EXAMPLE 5

An aqueous solution of kerosene phenol sulfonic acid employed in above Example 2 is neutralized with commercial 95 per cent nicotine base, with the addition of sufficient alcohol to permit the neutralized mixture to be agitated thoroughly and easily. After neutralization, the alcohol is evaporated until the mixture is non-inflammable.

The following table illustrates the insecticidal action of the products of above Examples 2 and 5.

IV. *Insecticide by spraying as contact poison*

| Product of example No. | Parasite | Percent concentration | Percent kill | Time in hours |
|---|---|---|---|---|
| 2 | Black ants | 0.5 | 90 | 48 |
| 5 | Aphis pomi | 0.04 | 100 | 24 |
| 5 | do | 0.03 | 98.6 | 24 |
| 5 | do | 0.02 | 82 | 24 |
| 5 | Leptinotarsa decemlineata | 0.5 | 100 | 24 |
| 5 | Aster lace fly | 0.3 | 100 | 48 |

V. *Insecticide by spraying as stomach poison*

| Product of example No. | Parasite | Percent concentration | Percent kill | Time in hours |
|---|---|---|---|---|
| 5 | Anasa tristis | 0.25 | 100 | 100 |
| 5 | do | Control | 5 | 100 |

EXAMPLE 6

The sodium salt of kerosene benzene sulfonic acid free from inorganic sulfates is dissolved in water. The effectiveness of the resulting solution as an insecticide appears from the following:

In insecticidal tests an aqueous solution of the sodium salt of kerosene benzene sulfonic acid at a concentration of 1 part of the said salt to 800 parts water was sprayed at 20 pounds pressure for 30 seconds on nasturtium plants infested with *Aphis rumicis* (black bean aphis). In three trials, the per cent kills after 24 hours were 78.1, 65.3 and 75.8. In like tests involving aqueous solutions of the same concentration, utilizing sodium kerosene phenol sulfonate free from inorganic sulfates, kills of 71.8, 75.6 and 61.8 per cent were obtained.

For purposes of comparison it is noted that in like tests at the same concentration, utilizing cetylated hydroxy diphenyl sodium sulfonate free from inorganic sulfates, kills of 41, 41.3 and 53 per cent were obtained.

While the invention has been particularly described above in connection with examples of alkyl phenol and alkyl benzene sulfonates, it will be understood the invention is not limited to these compounds as insecticides, but includes such use of other substituted alkyl benzene sulfonates, for example alkyl toluene-, alkyl phenetole-, alkyl cresol-, alkyl chlorbenzene sulfonates, etc., and alkyl naphthalene sulfonates. Thus, a mixture of alkyl derivatives of naphthalene in which the alkyl groups are derived from a petroleum distillate whose boiling point lies within the range of 170°–320° C. at atmospheric pressure may be sulfonated and the sulfonation mixture neutralized to produce an insecticidal composition coming within the scope of this invention. The present invention further includes the use as insecticides of mixtures of two or more alkyl aromatic sulfonates of the type herein disclosed.

This application is a continuation-in-part of my application Serial No. 93,718, filed July 31, 1936, which issued as United States Patent No. 2,233,407 and which in turn is a continuation-in-part of application Serial No. 737,777, filed July 31, 1934, which issued as United States Patent No. 2,196,985, and of application Serial No. 691,082, filed September 26, 1933, which issued as United States Patent No. 2,249,757.

I claim:

1. The process of controlling insect pests infesting vegetation, which comprises subjecting the insect pests to the insecticidal action of a composition comprising as an ingredient toxic to insects a mixture of nuclearly alkylated aromatic hydrocarbon sulfonates containing at least 10 carbon atoms in an alkyl group, in which the aryl nucleus is selected from the class consisting of benzene and naphthalene hydrocarbon nuclei and the alkyl group is derived from a mineral oil.

2. The process of controlling insect pests infesting vegetation which comprises subjecting the insect pests to the insecticidal action of an insecticide comprising as an ingredient toxic to insects a mixture of nuclearly alkylated aromatic hydrocarbon sulfonates containing at least 10 carbon atoms in an alkyl group, in which the aryl nucleus is a single benzene hydrocarbon nucleus and the alkyl group is derived from a mineral oil.

3. The process of controlling insect pests infesting vegetation which comprises subjecting the insect pests to the insecticidal action of a composition comprising as an ingredient toxic to insects a mixture of sulfonated alkyl aromatic hydrocarbons of the type A′RS, in which A′ represents an aryl nucleus selected from the class consisting of benzene and naphthalene hydrocarbon nuclei, R represents a nuclear alkyl group containing at least 10 carbon atoms, and S represents a nuclear substituent selected from the group consisting of the free sulfonic acid group and salts of said group, said mixture containing a plurality of related sulfonated alkyl aromatic hydrocarbons which differ from each other in the alkyl group represented by R.

4. The process of controlling insect pests infesting vegetation which comprises subjecting the insect pests to the insecticidal action of a composition comprising as an ingredient toxic to insects a nuclearly alkylated aromatic sulfonate obtainable by the halogenation of a petroleum distillate whose boiling point lies within the range 170° C. to 320° C. at atmospheric pressure, condensation of at least a portion of the resulting halogenated product with an aromatic compound of the group consisting of benzene and naphthalene, and sulfonation of at least a portion of the resulting condensation product, said sulfonation product containing a member selected from the group consisting of the free sulfonic acid group and salts of said group.

5. The process of controlling insect pests infesting vegetation, which comprises subjecting the insect pests to the insecticidal action of a composition containing as an essential insecticidal constituent a mixture of alkylated mononuclear aromatic hydrocarbon sulfonates which differ from each other in the alkyl groups, the alkyl groups being derived from a petroleum distillate which boils mainly within the range 170° to 320° C. at atmospheric pressure.

6. The process of controlling insect pests infesting vegetation, which comprises subjecting the insect pests to the insecticidal action of a composition containing as an essential insecticidal constituent a mixture of alkylated sulfonates of benzene which differ from each other in the alkyl groups, the alkyl groups being derived from a petroleum distillate which boils mainly within the range 170° to 320° C. at atmospheric pressure.

7. The process of controlling insect pests infesting vegetation which comprises subjecting the insect pests to the insecticidal action of a composition consisting of a mixture of alkylated sulfonates of an aromatic hydrocarbon selected from the class consisting of benzene and naphthalene hydrocarbons, which alkylated sulfonates differ from each other in the alkyl groups, the alkyl groups being derived from a petroleum distillate which boils mainly within the range of 170° to 320° C. at atmospheric pressure.

8. The process of controlling insect pests infesting vegetation which comprises subjecting the insect pests to the insecticidal action of a composition consisting of a mixture of alkylated sulfonates of benzene which differ from each other in the alkyl groups, the alkyl groups being derived from a petroleum distillate which boils mainly within the range 200° to 290° C. at atmospheric pressure.

9. The process of controlling insect pests infesting vegetation which comprises spraying on said infested vegetation an aqueous solution containing as an ingredient toxic to insects a mixture of alkylated sulfonates of an aromatic compound of the group consisting of benzene and naphthalene, which alkylated sulfonates differ from each other in the alkyl groups each of which contains at least 10 carbon atoms, said solution having a concentration not exceeding about 5% by weight of said alkylated sulfonates.

10. The process of controlling insect pests infesting vegetation which comprises spraying on said infested vegetation a solution containing as an ingredient toxic to insects a mixture of alkylated sulfonates of benzene which differ from each other in the alkyl groups, the alkyl groups being derived from a petroleum distillate which boils mainly within the range of 170° to 320° C. at atmospheric pressure, said solution having a concentration of 0.1% to 1.0% by weight of said mixture of alkylated sulfonates, whereby control of said insect pests is obtained without injuring said vegetation.

LAWRENCE H. FLETT.